United States Patent
Eriksson

(10) Patent No.: US 6,321,688 B1
(45) Date of Patent: Nov. 27, 2001

(54) TEAT CLEANING DEVICE AND METHOD

(75) Inventor: Jan Eriksson, Uttran (SE)

(73) Assignee: Alfa Laval Agri AB, Tumba (SE)

( * ) Notice: Subject to any disclaimer, the term of this patent is extended or adjusted under 35 U.S.C. 154(b) by 0 days.

(21) Appl. No.: 09/463,897

(22) PCT Filed: Jul. 31, 1998

(86) PCT No.: PCT/SE98/01430

§ 371 Date: Apr. 13, 2000

§ 102(e) Date: Apr. 13, 2000

(87) PCT Pub. No.: WO99/05904

PCT Pub. Date: Feb. 11, 1999

(30) Foreign Application Priority Data

Jul. 31, 1997 (SE) .................................................. 9702837

(51) Int. Cl.$^7$ .................................................. A01K 29/00
(52) U.S. Cl. .......................................... 119/663; 119/651
(58) Field of Search ............................. 119/14.1, 14.02, 119/14.18, 651, 663, 670

(56) References Cited

U.S. PATENT DOCUMENTS

| Re. 36,391 | * | 11/1999 | van den Berg et al. | 119/14.08 |
|---|---|---|---|---|
| 5,383,423 | * | 1/1995 | van der Lely | 119/14.1 |
| 5,390,627 | * | 2/1995 | van den Berg et al. | 119/14.08 |
| 5,862,776 | * | 1/1999 | van den Berg | 119/14.1 |

FOREIGN PATENT DOCUMENTS

| 0309036 | 3/1989 | (EP) . |
|---|---|---|
| 0399132 | 11/1990 | (EP) . |
| 0572068 | 12/1993 | (EP) . |
| 0726027 | 8/1996 | (EP) . |
| 2559351 | 8/1985 | (FR) . |

* cited by examiner

Primary Examiner—Charles T. Jordan
Assistant Examiner—Judith A. Nelson
(74) Attorney, Agent, or Firm—Weingarten, Schurgin, Gagnebin & Hayes LLP

(57) ABSTRACT

A device for cleaning a teat (3) has a movable rotatable cleaning means (29) which is movable from a lower teat receiving position (LO) to an upper teat cleaning position (UP).

21 Claims, 8 Drawing Sheets

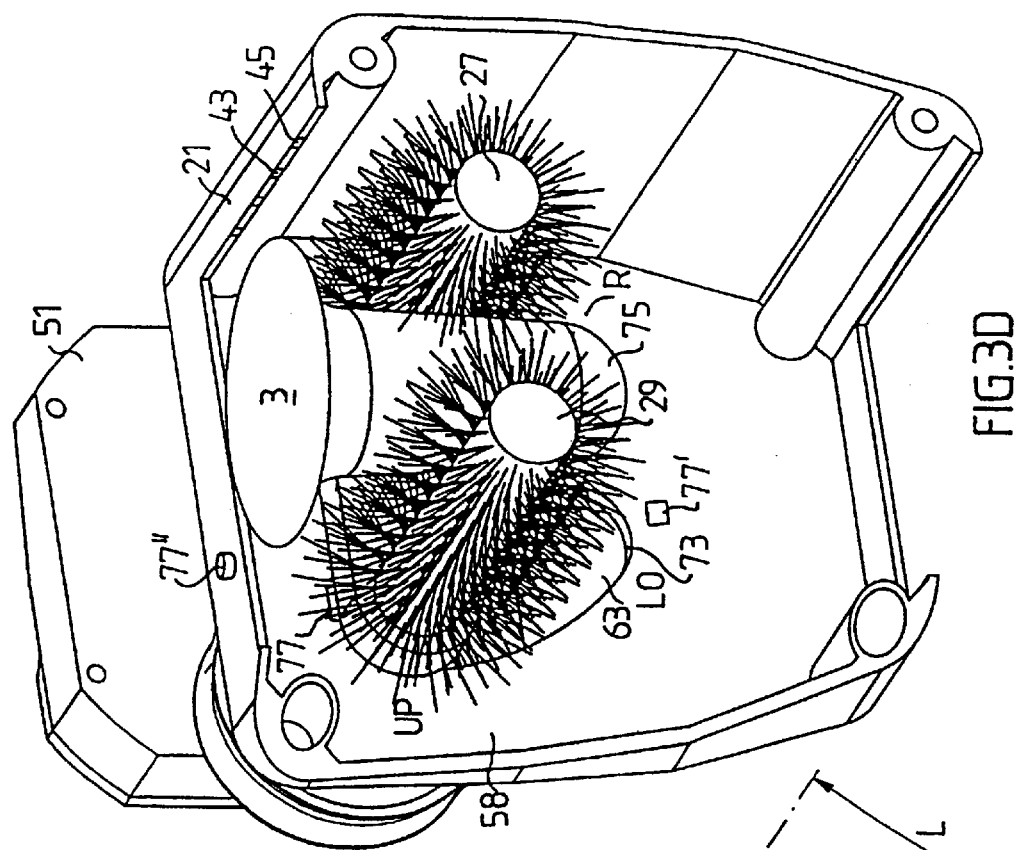
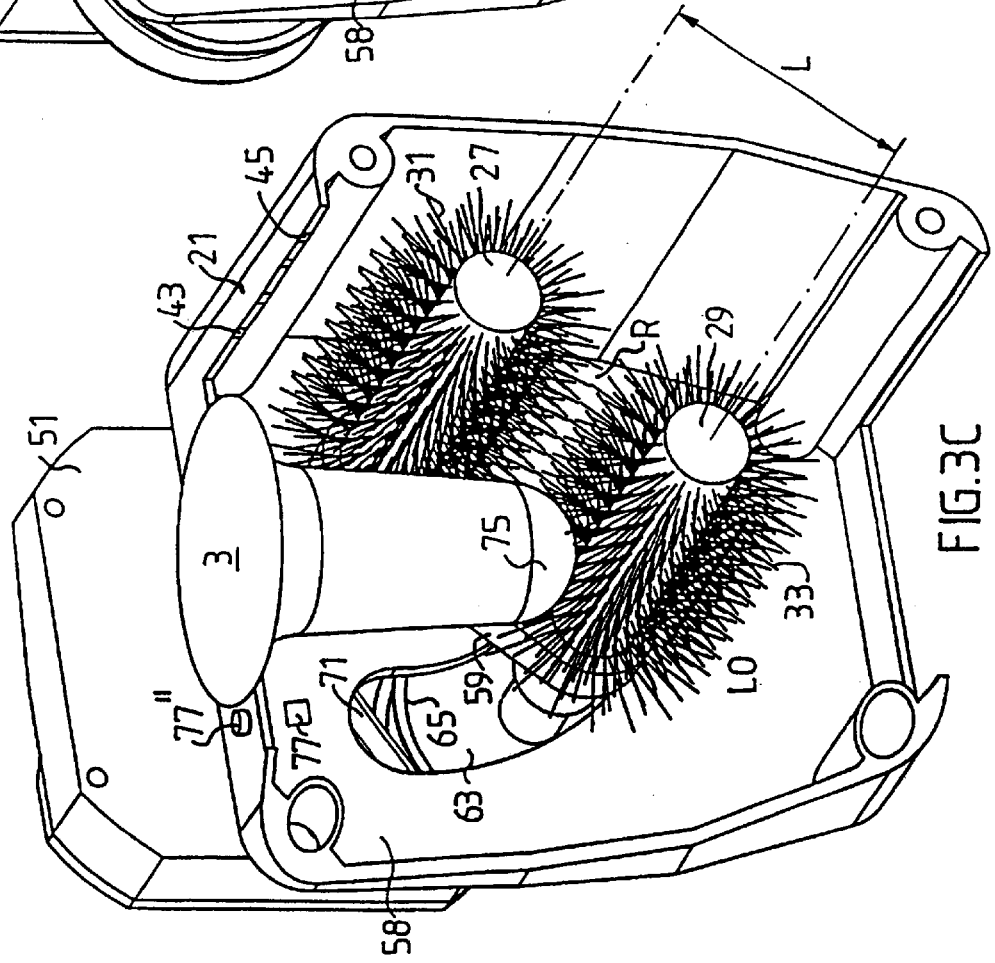
FIG.3D
FIG.3C

TEAT CLEANING DEVICE AND METHOD

TECHNICAL FIELD OF THE INVENTION

The present invention relates to an apparatus for cleaning at least one teat of an animal, comprising at least one rotatable cleaning means applicable to said at least one teat.

The invention also relates to a method of cleaning at least one teat of an animal.

BACKGROUND OF THE INVENTION

One essential step in the milking process for dairy animals, such as cattle, goats, sheep, horses, buffaloes and the like, is to effectively clean the teats of the animal to be milked before the actual milking can start. If the teats are not properly clean then the milk is likely to become contaminated by dirt on the teats and will not be fit for human consumption. If milk from one animal, whose milk happens to be contaminated, is collected in a large receptacle together with milk from other animals, large quantities of milk may have to be discarded. Furthermore the whole milking system will have to be thoroughly cleaned before a new animal can be milked. Consequently, failure to clean the teats properly will be both costly and time-consuming. Therefore the cleaning is an essential operation which should take place before the actual milking can be performed.

To obtain proper cleaning is especially difficult if an automatic milking system is used, since there is no checking performed by a person as is the case during manual cleaning. It is particularly important that the tips of the teats are cleaned as any contamination present here will naturally be picked up by the flow of milk and carried into the milk reservoir.

One of the most frequent ways of cleaning teats and udders is using one or several brushes or similar equipment which perform cleaning by means of friction, which is the result of moving the brushes against the teats/udder. This may be performed as a dry cleaning or as wet cleaning process. In the case of dry cleaning no liquid is added, and in wet cleaning a liquid, such as water and a detergent, is added, which is considered to improve the cleaning process.

FR-A-2 559 351 shows a teat-cleaning device comprising a hand unit which contains two horizontal parallel cylindrical brushes which are separated by a gap which is large enough to permit a teat to pass between the brushes. The brushes counter rotate so that in the gap the bristles of the brushes move downwards and brush contamination downwards towards the tip of the teat. When the teat is withdrawn from the device it is hoped that the tip will be brushed clean but no special provisions are made to brush the tip of the teat.

A device shown in EP-B 0 399 132 comprises a teat-cleaning device comprising a hand unit which also contains two horizontal parallel counter-rotating cylindrical brushes and additionally a tip cleaning third brush mounted below the first two brushes. As the teat is introduced into the hand unit a horizontal guide roller below the first brushes is intended to guide the tip of the teat into contact with the third brush. In order to achieve satisfactory brushing of the tip of a teat with a brush made of bristles it is important that the tips of the bristles come into contact with the area to be cleaned. This causes contaminants to be flicked off the tip of the teat. If, on the contrary, the tip of teat is introduced too far into the third brush such that the tip comes into contact with the bristles near their roots then the bristles tend to bend back which cause contamination to be smeared around the tip instead of being flicked away. As the three brushes are fixed in relation to each other teats which are too short to reach the third roller do not have their tips cleaned and tips which are too long may be subjected to smearing of contaminants or are otherwise inadequately cleaned.

SUMMARY OF THE INVENTION

An object of the invention is to provide a teat cleaning device which is suitable for cleaning teats of different lengths and a method using said device.

This object is achieved by means of an apparatus for cleaning teats having supporting means such as a housing or tubular frame which contain a cleaning means such as a first rotating brush which is preferably but not necessarily fixed relative the supporting means and a second rotating cleaning means such as a rotating sponge and/or brush which is movable with respect to the supporting means. This second cleaning means is movable between a lower teat receiving position and an upper teat cleaning position. The second cleaning means is moved between the lower and upper position preferably by means of the reactive force that it exerts on a teat which has been brought into contact with it. In other words when the supporting means is moved, for example, upwards so that a teat is brought into contact with the surface or bristles of the second cleaning means then a frictional reactive force occurs between the teat and the surface and/or bristles. This force is small to begin with and the surface or bristles of the second cleaning means can clean the tip of the teat without smearing contamination over the surface of the teat. In this way a reliable and complete cleaning of the teat tip is obtained. As more of the weight of the teat acts on the second cleaning means then the frictional forces and other reactive forces increase. When these forces increase sufficiently to overcome the gravitational, frictional and other forces, e.g. spring forces, holding the second cleaning means in the lower position then the rotation of the cleaning means will cause the movable second cleaning means to climb up the teat to the upper position. In order to ensure that the sides of the teat are reliably and completely cleaned the position of the cleaning means and a possible guiding means such as a guide roller are chosen such that the teat is guided along a predetermined path which ensures that the complete side and ends of teats of any length are brought into contact with the cleaning means.

BRIEF DESCRIPTION OF THE DRAWINGS

The invention will be described in more detail below by means of examples of embodiments and with reference to the accompanying drawings, in which:

FIG. 3c) is a partially cutaway perspective view of the first embodiment of a cleaning device according to the invention showing the second cleaning means in a first, lower position;

FIG. 3d) is a partially cutaway perspective view of the first embodiment of a cleaning device according to the invention showing the second cleaning means in a second, upper position;

DESCRIPTION OF THE PREFERRED EMBODIMENTS

Figure 1:
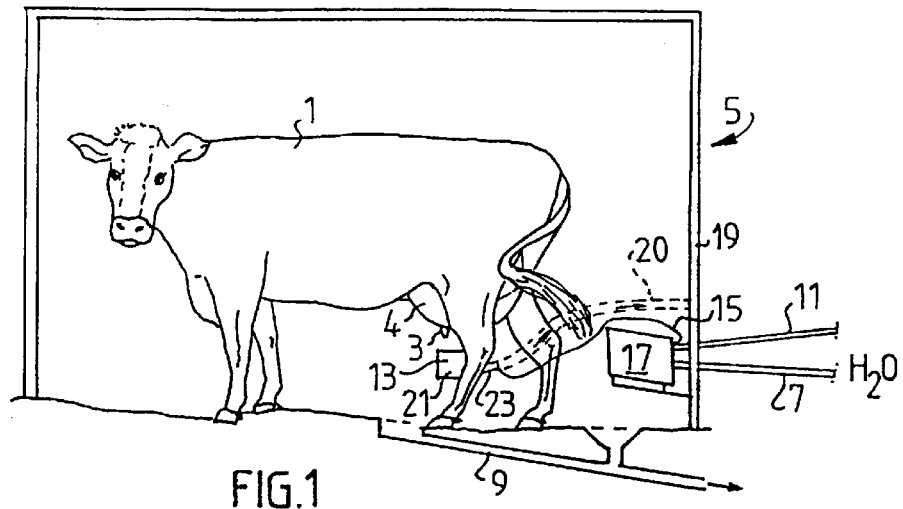
FIG. 1 is a schematic view of an animal teat cleaning arrangement comprising a first embodiment of a teat cleaning device according to the invention.

FIG. 1 shows schematically an embodiment of manual cleaning arrangement according to the invention for a cow 1 which has teats 3 which are to be cleaned. Cow 1 is shown in a cleaning area 5 which can be a stall in a dairy or a farm or the like. Such cleaning areas 5 are well-known in the art and is shown here only schematically. Cleaning area 5 has a cleaning water supply 7, a waste water outlet or collector 9 which can be connected to a storage tank (not shown) for recycling or later use, for example rinsing the stall floor, and a power supply 11 which can be of any suitable type such as for example electrical, pneumatic and/or hydraulic.

A teat cleaning device 13 according to a first embodiment of the invention is shown positioned below the teats 3 of the cow 1. Teat cleaning device 13 is connected by a flexible power and water cable or cables 15 to a holder 17 mounted on the frame 19 of the cleaning area 5. The present teat cleaning device 13 can also be used in an automatic cleaning robot and can be mounted on a maneuvering means 20, for example a hinged arm shown here by dashed lines. Holder 17 is connected to water supply 7 and power supply 11. The teat cleaning device 13 can be cleaned and stored in holder 17 which can be provided with cleaning and disinfecting means (not shown) such as water and disinfectant nozzles and cleaning brushes or scrapers or the like. Teat cleaning device 13 has a supporting means 21, shown here as an enclosing housing to prevent the operator from being splashed, and a handle 23 which is intended to be held by an operator (not shown). Housing 21 has an opening (not shown) in the top surface and a teat 3 can be introduced through this opening for cleaning by the operator lifting the teat cleaning device 13 up towards the udder 4.

Figures 2A, 2C:
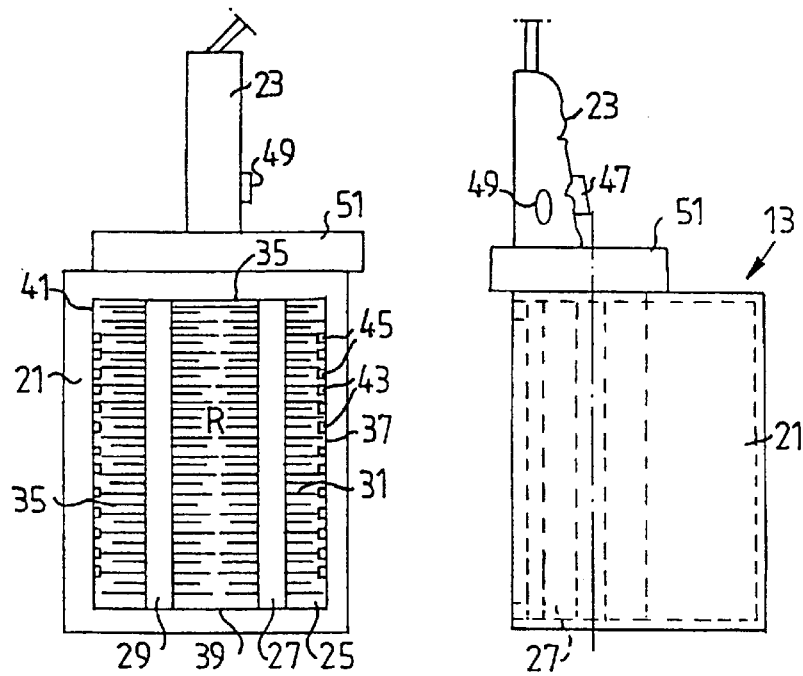
FIG. 2a) is a plan view from above of a first embodiment of the teat cleaning device according to the invention.
FIG. 2c) is a side view of the first embodiment of the teat cleaning device according to the invention.
Figure 2B:
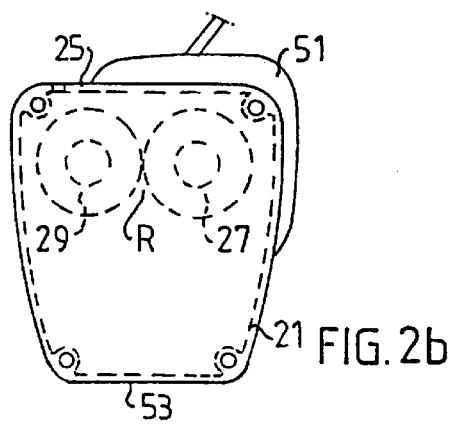
FIG. 2b) is a end view of the first embodiment of the teat cleaning device according to the invention.

FIG. 2a) shows a plan view from above of the first embodiment of a teat cleaning device 13 according to the invention. The teat cleaning device has supporting means such as a housing 21 which supports cleaning means 27, 29. Housing 21 has an upper opening 25 through which one or more teats can be introduced for cleaning. Inside the housing are arranged two rotatable cleaning means 27, 29. The cleaning means are shown here as brushes 27, 29 but which could be any suitable means such as sponge or textile rollers or the like. In the event that supporting means 21 is used in an automatic milking or cleaning device then it does not have to be a housing but can be a simple plate or open framework suitably adapted to support the brushes 27, 29. Brushes 27, 29 are arranged spaced apart and substantially parallel to the longitudinal axis of the housing 21 and parallel with each other. Brush 27 is non-displaceably attached to housing 21 while brush 29 is displaceably attached to housing 21. Brushes 27, 29 have substantially radially projecting bristles 31, 33 which preferably meet or overlap in the region R between the brushes 27, 29. The bristles 31, 33 preferable do not have a uniform length but are provided in a number of different lengths in order to ensure that no matter what size of teat 3 is being cleaned the tip of some bristles 31, 33 come into contact with surface of the teat 3. Brush 29 is shown in an upper position in FIGS. 2a)–2c).

Some or all of the edges 35, 37, 39, 41 of opening 25 are provided with water emitting means such as nozzles 43 and drying air means such as air outlet slots 45. Nozzles 43 are connected via cable 15 to the water supply 7 and supply water to the brushes and teat(s) when washing is taking place. Disinfectant and/or cleaning solutions can be added to the water supply, for example, during separately controllable phases of the cleaning operation. Air outlet slots 45 are connected to a suitable air supply which, in the case that the teat cleaning device 13 is pneumatically powered, could be the same as the power supply 11. Air emitted from outlet slots 45 can be used to speed up drying of washing teats 3. The air can be pre-heated to further speed up the drying time. Starting and stopping of the water, respective, air supply to nozzles 43 and slots 45 and power supply to the brush driving means (described later) can be controlled by an operator by means of one or more triggers 47 or buttons 49 on handle 23 which is mounted at one end of the housing 21.

Drive means (not shown) of any type suitable for rotating brushes 27, 29, e.g. electrically, pneumatically or water driven, are contained in a motor housing 51. Motor housing 51 in this embodiment which is intended for manual operation is preferably mounted between housing 21 and handle 23 in order to improve the balance of the teat cleaning device 13 and to minimize operator fatigue.

Housing 21 has an opening 53 in its bottom surface to prevent water collecting inside the housing.

Figures 3A, 3B:
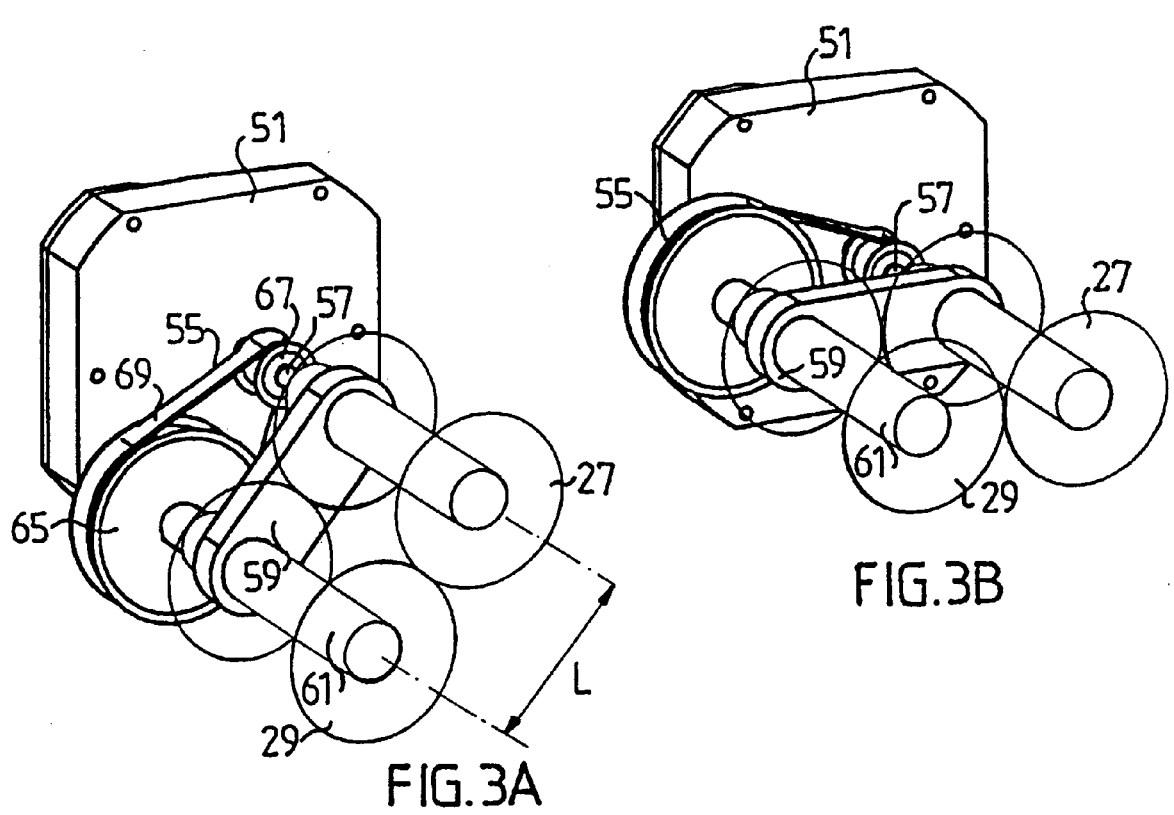
FIG. 3a) is a partially cutaway perspective view of a drive arrangement for a cleaning device according to the invention with the second cleaning means in a first, lower position.
FIG. 3b) is a partially cutaway perspective view of a drive arrangement for a cleaning device according to the invention with the second cleaning means in a second, upper position.

FIG. 3a) shows motor housing 51 and an example of a drive means 55 for rotating brushes 27,29 (represented by circles for the sake of clarity of illustration in FIGS. 3a) and 3b)). Motor housing contains a means (not shown) for producing rotary motion such as a pneumatic or fluid powered motor or an electric motor which has a rotatable output shaft 57. Output shaft 57 projects out from the side of motor housing 51 which faces towards housing 21 (see FIGS. 3c) and 3d)) and is mounted in a bearing (not shown) in the end wall 58 of housing 21. Shaft 57 continues into housing 21 and has brush 27 so attached to it that it rotates when shaft 57 rotates. A radially projecting swinging arm 59 is mounted on shaft 57 by means of a bearing (not shown) so that it can freely rotate around shaft 57. The distal end of swinging arm 59 has a second shaft 61, parallel to shaft 57, mounted in a bearing (not shown) for free rotation with respect to swinging arm 59. The distance between centers of shafts 57 and 61 is L centimeters where L is between 2 and 15 centimeters preferably between 3 and 5 cm for cleaning devices adapted to dairy cows. The distance L is chosen to be sufficiently large to allow the widest possible teats to pass between the shafts 57, 61 without damage while at the same time it is sufficiently narrow to enable the brushes to get a firm grip on the narrowest teats. Preferably swinging arm 59 is provided with adjustment means (not shown) to enable the distance L to be varied. Brush 29 is so attached to shaft 61 that it rotates when shaft 61 rotates. Shaft 61 projects through a hole 63 (see FIGS. 3c) and 3d)) in the end wall 58 of housing 21 towards motor housing 51. A pulley wheel 65 is rigidly attached to shaft 61 between the housing 21 and motor housing 51. Another pulley wheel 67 is rigidly attached to shaft 57 between the housing 21 and motor housing 51. Pulley wheels 65 and 67 are drivingly connected by drive belt 69. Pulley wheels 65, 67 are shown here as being of different size but they may be the same size so that shafts 57, 61 rotate at the same speed. It is preferable that the shafts 57, 61 rotate in opposite directions so pulley wheel 65 is preferably constructed with some internal gearing arrangement (not shown) with for example an idle wheel or some other drive means in order to reverse the direction of rotation of shaft 61 and to cause the shafts 57, 61 to rotate in opposite directions.

FIGS. 3c) and 3d) show that hole 63 in the end wall 58 of housing 21 is an arc of a circle substantially concentric with shaft 57 and is positioned at the distance L corresponding to the distance between the centers of the shafts 57, 61 away from shaft 57. Hole 63 has a width and radius of curvature which are adapted such that shaft 61—and hence swinging arm 59, can move freely between the ends of the arc. The upper end 71 of hole 63 is at approximately the same level as shaft 57 and conveniently in this position shafts 57, 61 are symmetrical with respect to the centerline of housing 21. The lower end 73 of hole 63 is at a lower level than shaft 57 and closer to the centerline of housing 21 than shaft 57 is. Swinging arm 59 tends to take up the lower position due to its own weight and can also be provided with spring or other force generating means 60 (shown by dashed lines in FIGS. 4a) and 4b)) which tend to hold it in the lower position. These force generating means can be made adjustable in order to vary the friction force ( and hence cleaning force) which must be exerted on the teat 3 in order for the brush 29 to climb up the teat 3.

FIG. 3c) shows a teat 3 being introduced through opening 25 into housing 21. Shaft 61 and brush 29 are at the lower end of hole 63 at a lower teat receiving position LO. Brushes 27, 29 are counter-rotating such that the direction of movement of the bristles 31,33 in the region R between brushes 27, 29 is in a substantially downward direction, and water and air (not shown for reasons of drawing clarity) are being supplied via nozzles 43 and slots 45. As housing 21 is raised towards the teat 3, the tip 75 of teat 3 is guided by the rotation of brushes 27, 29 into the region between the brushes. As it is being guided the tip 75 is brushed and cleaned by the bristles 31, 33, in particular bristles 33 on the movable brush 29.

As teat 3 approaches the region between the brushes it will be drawn into this region by the forces acting on the teat 3 as a result of the rotation of brushes 27, 29. In addition to friction forces it is also possible that mechanical gripping forces occur between the bristles 33 and teat 3 i.e. the bristles grip on irregularities in, or roughness of, the surface of the teat and the expression reactive forces will be used from now on to mean any friction or mechanical forces occurring between the rotatable cleaning means 27, 29 and the teat as a result of the rotation of the rotatable cleaning means 29. As these reactive forces increase as the teat is fully received in housing 21, they will overcome the forces holding swinging arm 59 at the lower end 73 of hole 63 and the rotation of brush 29 will cause it to climb up teat 3 until it reaches the upper teat cleaning position UP at the upper end 71 of hole 63 as shown in FIG. 3d). As it climbs up the teat 3 it will clean the surfaces of the teat that it comes into contact with. The housing 21 can be lifted until substantially all the length of the teat has passed between brushes 27, 29 and housing 21 comes into contact with the udder 4 of the cow 1.

Housing 21 can be provided with sensor means 77, e.g. proximity sensing means or a limit-switch which are activated by swinging arm 59 reaching the upper end 71 of hole 63. Sensor means can operate a signaling means such as lamp 78 to give an indication to an operator that the teat has been cleaned. Optionally further sensor means 77' can be provided which are activated by swinging arm 59 reaching the lower end 73 of hole 63. Further sensing means 77" can detect when housing 21 contacts udder 4. The operator can lower and raise housing 21 a number of times in order to ensure that the teat has been fully cleaned. If the housing 21 is lowered such that the teat 3 remains between rotating brushes 27, 29 then the rotation of the brushes will hold the teat in place between them and ensure that substantially the whole of the surface of the teat 3 will be cleaned as it is raised and lowered between the brushes. By lowering the housing 21 even more such that the teat 3 leaves the region between the brushes 27, 29 it is possible to cause the swinging arm 59 to return to the lower end 73 of hole 63 and hence enable re-cleaning of the tip if necessary. The distance between the brushes 27, 29 can be adapted so that in the upper position the teat 3 is clamped between the brushes 27, 29 which permits some degree of pre-milking stimulation of the teat 3. The operator can adjust the extent, and number, of repeated lowerings and raisings of the housing 21 as required until a visibly clean teat 3 is obtained.

Figure 4B:
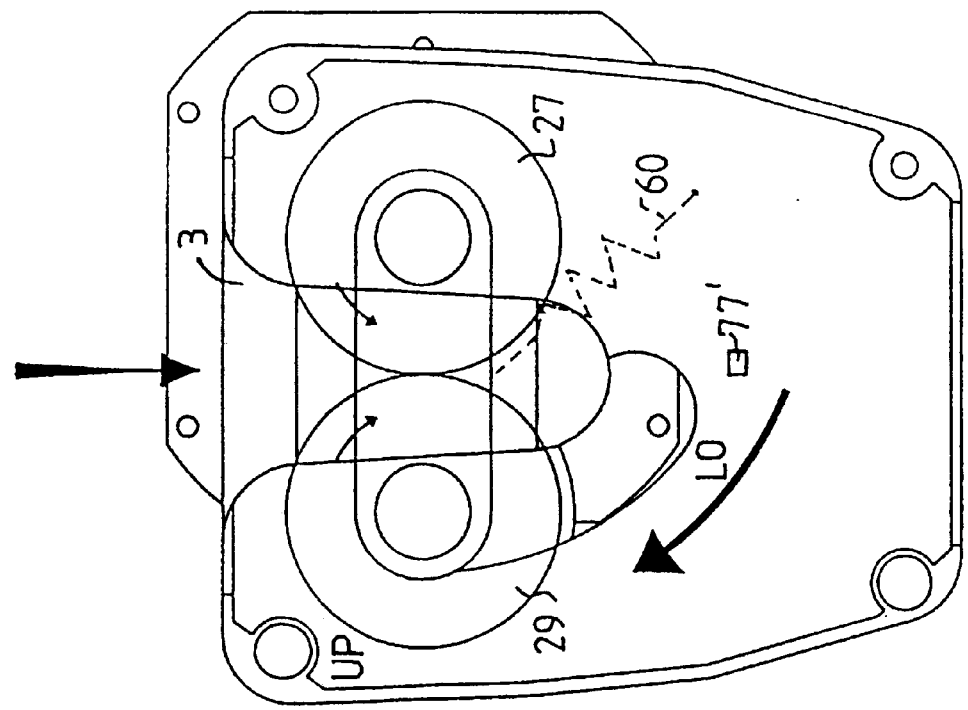
FIG. 4b) is an end cutaway view corresponding to the view of FIG. 3d).
Figure 4A:
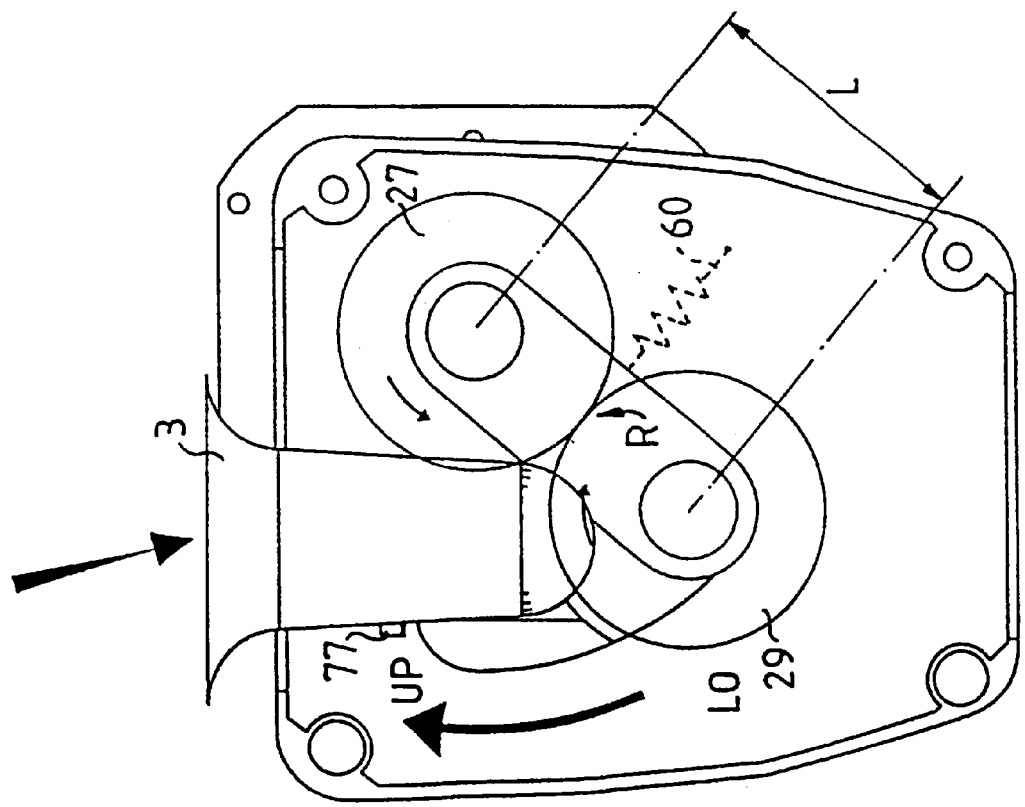
FIG. 4a) is an end cutaway view corresponding to the view of FIG. 3c)

FIGS. 4a) and 4b) show views corresponding to FIGS. 3c) and 3d) respectively wherein the movements of the teat 3 and swinging arm 59 can be seen more clearly.

Figure 5A:
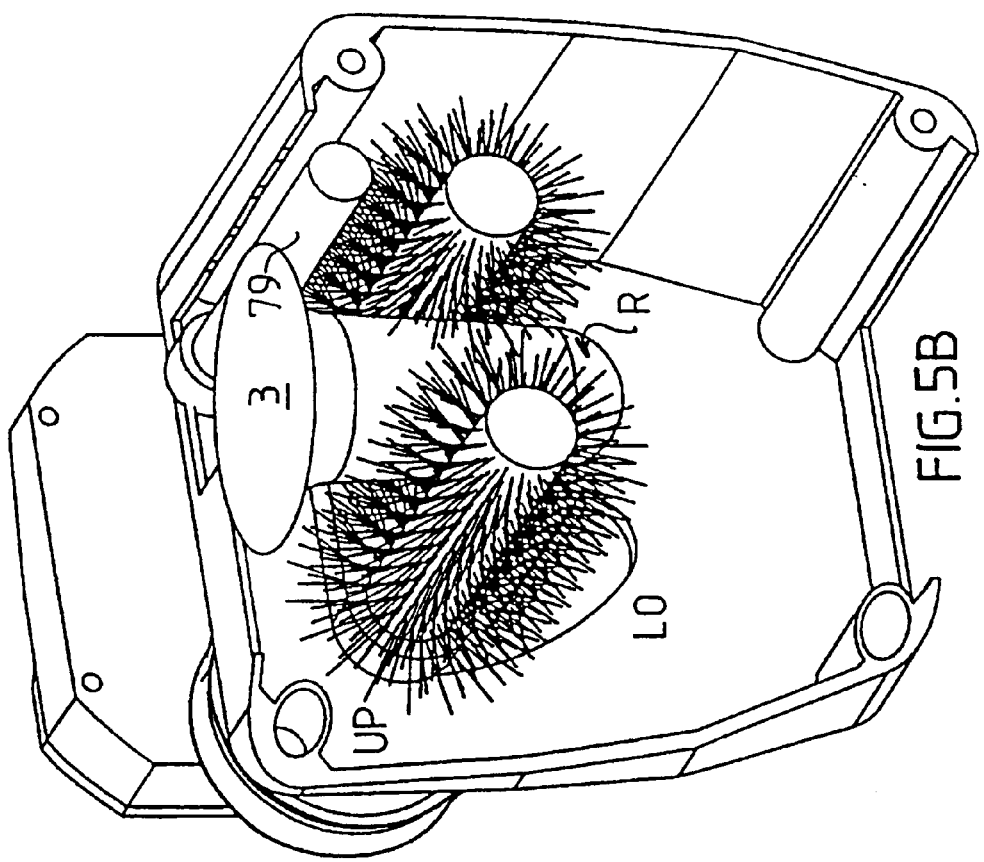
FIG. 5a) is a partially cutaway perspective view of the second embodiment of a cleaning device according to the invention showing the second cleaning means in a first, lower position.
Figure 5B:
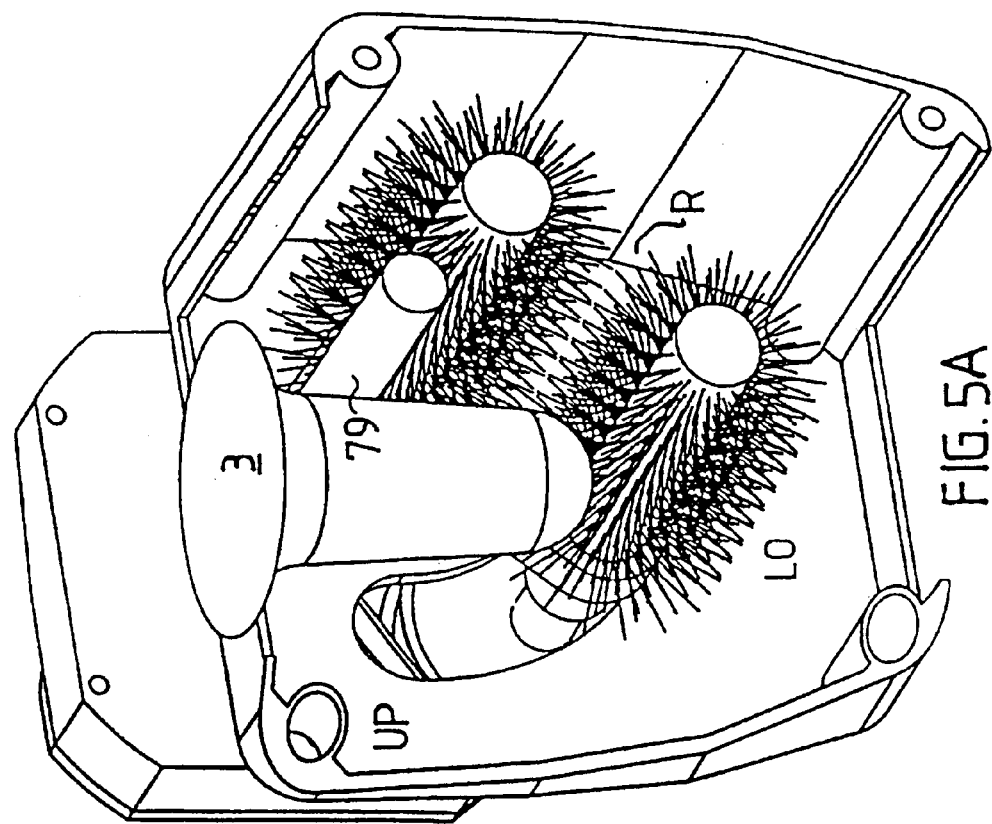
FIG. 5b) is a partially cutaway perspective view of the second embodiment of a cleaning device according to the invention showing the second cleaning means in a second, upper position.

FIGS. 5a) and 5b) show a second embodiment of a teat cleaning device 13 in which the same reference numerals have been used for parts corresponding to those of the previous embodiment. This embodiment differs from the previous embodiment by the provision of a teat guiding means for example a guide bar or guide roller 79.

Figure 6B:
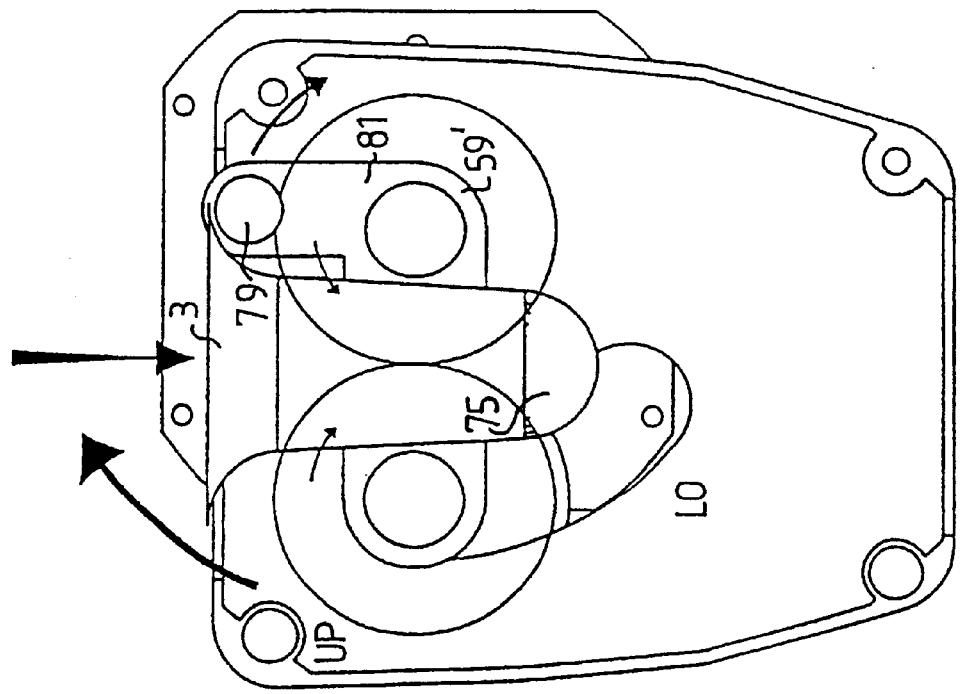
FIG. 6b) is an end cutaway view corresponding to the view of FIG. 5b)
Figure 6A:
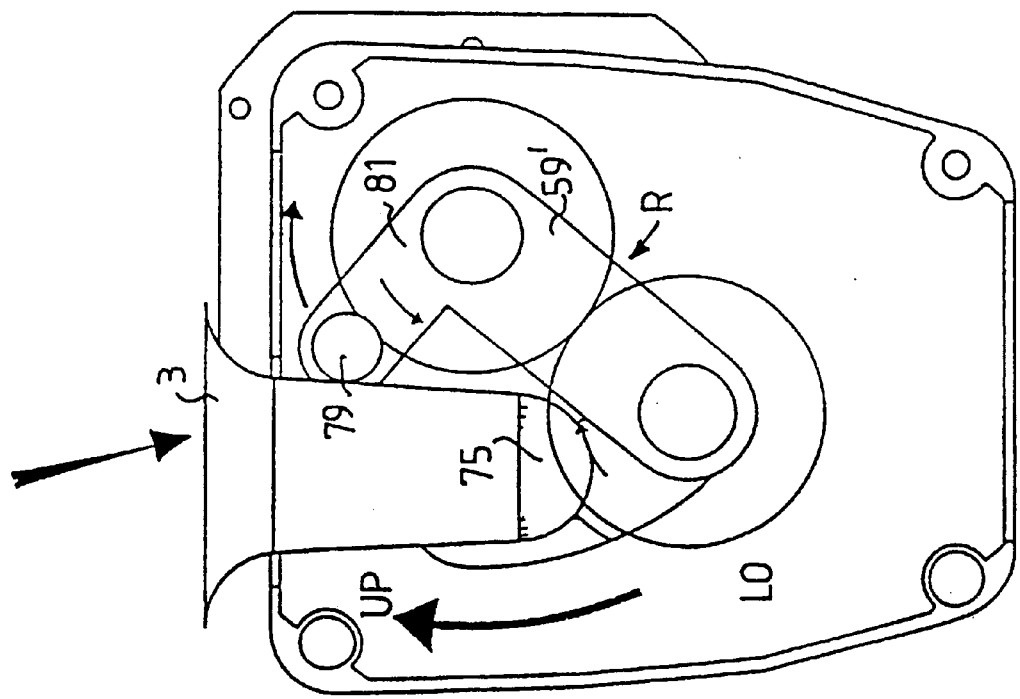
FIG. 6a) is an end cutaway view corresponding to the view of FIG. 5a)

As can be seen more clearly in FIGS. 6a) and 6b) which correspond to FIGS. 4a) and 4b) for the previous embodiment, guide roller 79 is mounted on an extension 81 on swinging arm 59' which is consequently L-shaped. When swinging arm 59' is in it's lowest position then guide roller 79 is positioned in the center region of opening 25 and guides teat 3 into contact with brush 29 as teat 3 enters opening 25. This ensures that the tip 75 of teat 3 is made to contact the bristles 33 of brush 29. As the housing 21 is further raised the teat is drawn by the bristles 33 of brush 29 into the region between brushed 27, 29 and as described above the brush 29 climbs up teat 3. As swinging arm 59' moves upwards guide roller moves away from the center region of opening 25 and allows the teat 3 to come into contact with brush 27. This embodiment consequently ensures that the tip 75 of the teat 3 is brushed and cleaned before the sides of teat 3 are cleaned.

It is also conceivable that the teat guide means shown as roller 79 do not have to be attached to the swinging arm 59' but can be movable or fixedly mounted directly on housing 21 for example resiliently mounted in a horizontal slot which extends from one edge of the opening 25 to the center of the opening 25. The guide means can, for example, be spring-biased towards the center of the opening to guide a teat to the movable brush 29 and then can slid sideways to be out of the way when the teat is drawn further into the housing.

Figure 7B:
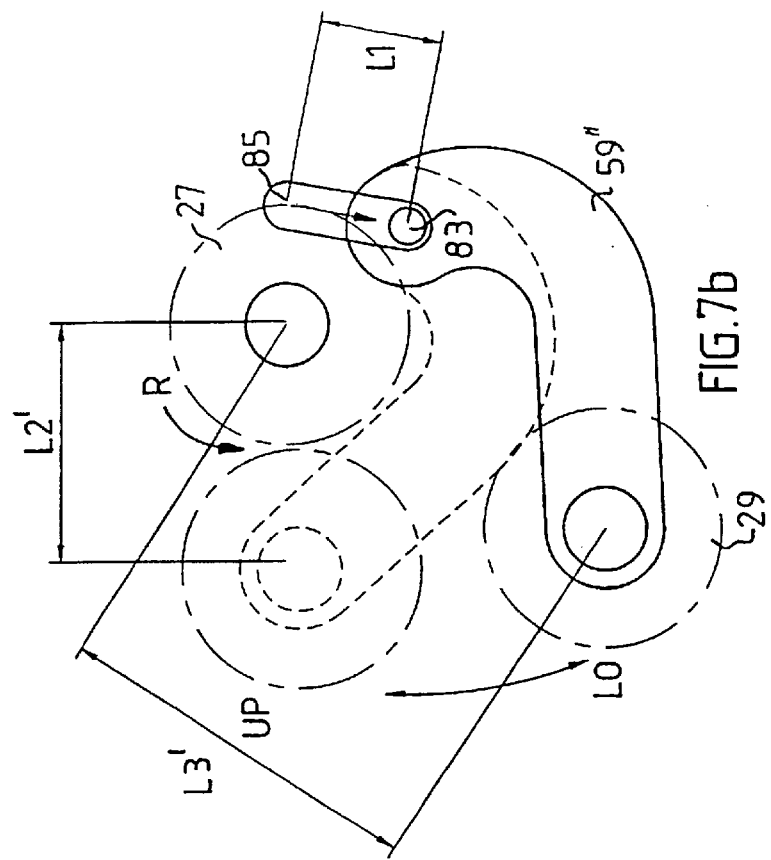
FIG. 7b) is a second end view showing the adjustable mounting means of FIG. 7a) in a second position.
Figure 7A:
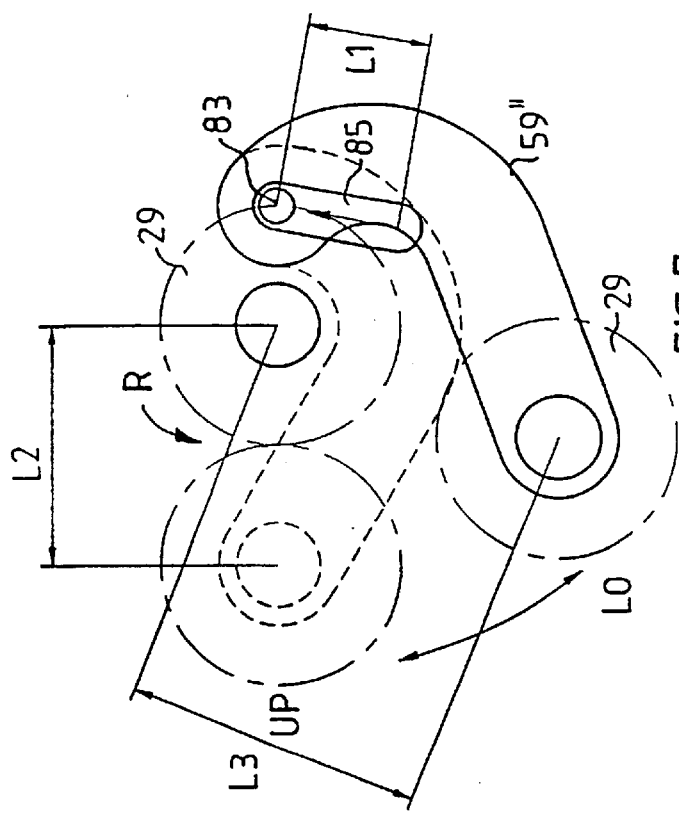
FIG. 7a) is an end view showing an embodiment of an adjustable mounting means in a first position.

FIGS. 7a) and 7b) show schematically an adjustable mounting for the radially projecting swinging arm 59 for a third embodiment of the invention. In this embodiment swinging arm 59" does not pivot about shaft 57 but instead is free to rotate about a pin 83 or other retaining means which is displaceable in a slot 85 of length L1 provided in the end wall 58 of housing 21. Means of any suitable type (not shown) are provided which enable an operator to adjust the position of pin 83 in slot 85.

As can be seen in FIG. 7a) when pin 83 is at the top of slot 85 the distance between centers of shafts 57 and 61 varies from L2 when shaft 57 is in its upper position to L3 when the shaft 61 is in its lower position.

In FIG. 7b) when pin 83 is at the bottom of slot 85 the distance between centers of shafts 57 and 61 varies from L2' when shaft 57 is in its upper position to L3' when the shaft 61 is in its lower position. In this embodiment L2' is the same as L2 and L3' is greater than L3. This enables the force which draws teats into the region between the brushes 27, 29 to be varied and also influences the force required for the brush 29 to climb up a teat. Thus when pin 83 is at the top of slot 85 then it is easier for brush 29 to climb up teat 3. If the pin 83 is at the bottom of slot 85 then it is more difficult for the brush 29 to climb up teat 3. This implies that brush 29 will be in its lower position against the tip 75 of teat 3 for a longer period of time which leads to even better cleaning of the tip 75. With the pin 83 in this position of travel of brush 29 is increased which makes this arrangement more suitable for cleaning longer teats.

It is possible to adapt the shape of arm 59" and slot 85 so that L2' can be smaller than L2. It then becomes possible to provide a pre-milking force to the teat. This can be achieved by first allowing the movable rotatable cleaning means 29 to reach the upper cleaning position UP at a distance L2 from rotatable cleaning means 27 with pin 83 in a first position then adjusting the position of pin 83 to a second position so that the movable rotatable cleaning means 29 moves closer to rotatable cleaning means 27 to a position where the distance between the rotatable cleaning means 27, 29 is L2'. This causes the teat 3 to be squeezed and by keeping pin 83 in this second position a downward squeezing and pulling force can be exerted on the teat when movable rotatable cleaning means 29 returns to the lower teat receiving position LO. These forces simulate a hand-milking action. Pin 83 can then be returned to the first position so that movable rotatable cleaning means 29 can climb up teat 3 again without squeezing it.

When used in an automatic milking apparatus it is possible for the travel of brush 29 to be automatically adjusted by using teat detection means, e.g. a video system, to measure the teat size and adapt the travel of brush 29 accordingly.

The dimensions of the arcuate hole (not shown) in the end wall of the housing are naturally adapted to accommodated the increased range of movement of shaft 61. Swinging arm 59" is shown curved in order to provide clearance with respect to shaft 27 but this clearance can also be provided in other ways such as by modifying the positions and designs of the components.

Figure 8:
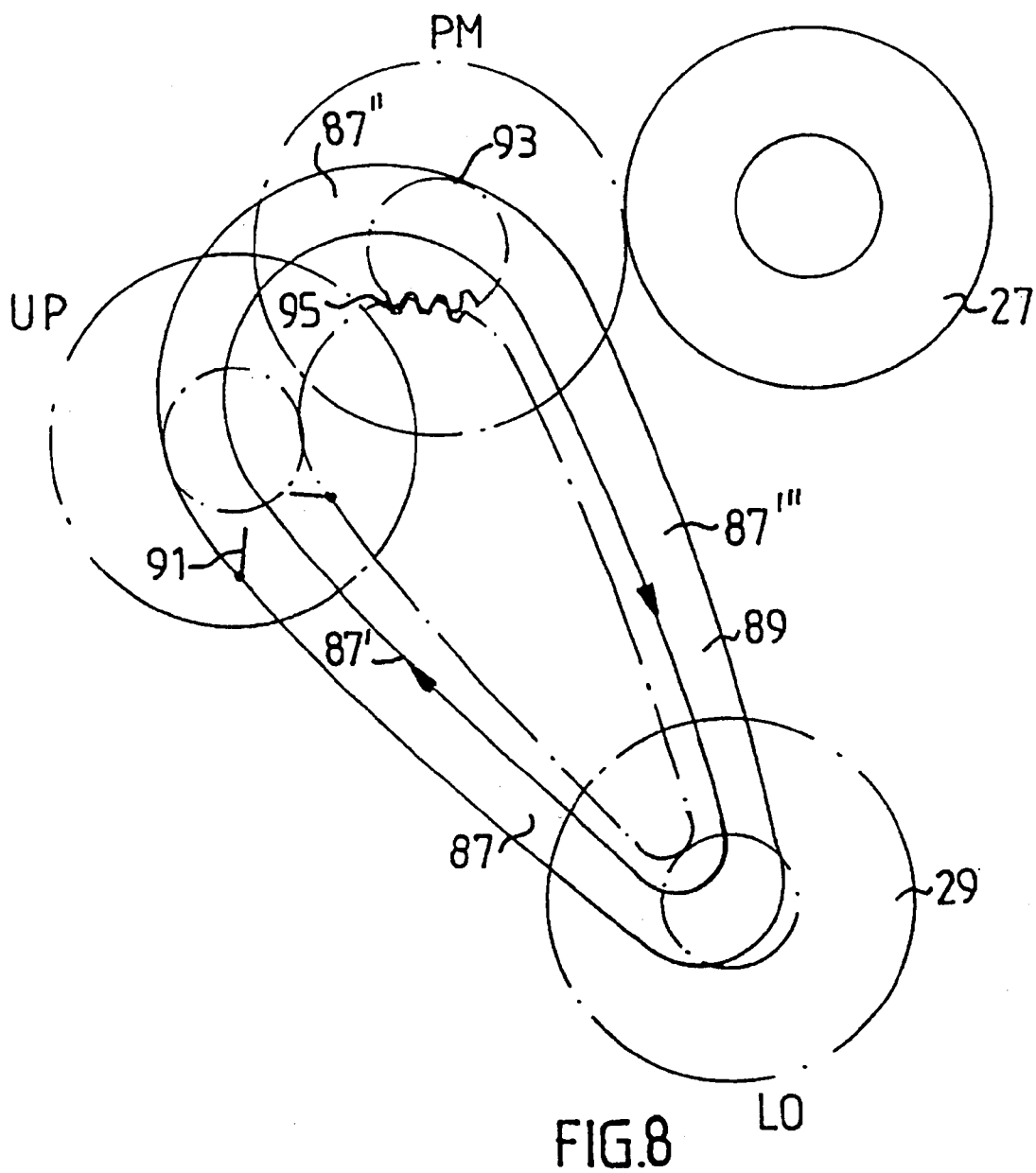
FIG. 8 shows an embodiment of a guiding means for a movable cleaning means.

Further embodiments and modifications of the invention are conceivable. In an improved embodiment of the invention of the movable brush is mounted on a shaft which is free to move in two slots or grooves formed in opposite ends of the housing. The loci of these slots do not have to be equidistant from the axis of rotation of the fixed brush, in which case the drive means for rotating the brush must be adapted to accommodate changing distances between the centers of the shafts. The slots or grooves could define loops such that the movable shaft traces different paths when going from the lower position to the upper position and vice versa. FIG. 8 shows an example of a guiding means for movable cleaning means 29. A path 87 which a movable cleaning means 29 (shown by dashed lines) takes when moving in a slot 89 is formed in the end walls of supporting means 21 in order to achieve a pre-milking effect. Movable cleaning means 29 starts at a lower teat receiving position LO and in a way similar to that described above is draw up the teat (not shown) to an upper cleaning position UP along path 87'. Further movement of the movable cleaning means 29 then is along path 87" in a direction closer to the other cleaning means 27 to a teat squeezing position PM. Further movement of the movable cleaning means is then in a downwards direction along path 87''' back to lower teat receiving position LO. This path is adapted so that the squeezing of the teat resembles hand-milking and can be dimensioned so that a pre-milking effect is achieved. Non-return means 91 of any suitable type, shown here schematically as hinged flaps, ensure that the movable cleaning means 29 follows the correct path. In order to ensure the correct travel of the movable cleaning means 29 it is conceivable that it has driving means such as, for example, a toothed portion 93 which engages a partially or completely toothed side 95 of slot 89 to drive it along slot 89. Other, more direct, driving means for causing the movable cleaning means to follow slot 89 are also conceivable.

The drive means can be of any suitable sort e.g. electrical, pneumatic, hydraulic and the transmission of movement to the brushes can be of any suitable type e.g. by chain, belt, inter-meshing gears, friction wheels and the like.

The rotatable cleaning means on the swinging arm is not limited to a single rotating brush or the like but can conceivably comprise a plurality of rotating brushes or the like.

In a further embodiment of the present invention the teat cleaning device is mounted on a robot arm for use in an automatic cleaning apparatus which can be part of an automatic milking device. In this embodiment the positioning and cleaning operations are controlled by a computer or the like. It this case it is particularly advantageous that the teat cleaning device is provided with end of travel sensing means or upper position sensing means which register when the movable brush has reached its upper position and if the supporting means is in contact with an udder. In this way a check is obtained that a teat has been introduced into the device and that the brush has climbed up it. It is also possible to have a lower position sensing means which indicated that the brush has returned to its starting position and which can detect jamming of the brush. These sensing means can be connected to an alarm and/or recording device in order to enable faults to be corrected and correct functioning to be recorded.

While the invention has been illustrated by examples of embodiments in which reactive forces between the teat being cleaned and the rotatable cleaning means are used to displace the movable rotatable cleaning means it is conceivable that the movable rotatable cleaning means can be displace by some actuating means such as a pneumatic or hydraulic actuator cylinder or a motor between its teat receiving lower position and teat cleaning upper position.

It is furthermore conceivable to adapt the invention to clean two or more teats at the same time.

Another conceivable modification of the invention would be to make more than one of the rotatable cleaning means movable in order to provide adjustment for different types and sizes of teats and different pre-milking movements.

What is claimed is:

1. A cleaning device, for cleaning at least one teat of an animal, comprising a supporting means supporting a plurality of rotatable cleaning means applicable to said at least one teat characterized in that one of said rotatable cleaning means is movable from a lower teat receiving position (LO) to an upper teat cleaning position (UP).

2. A device according to claim 1 characterized in that said movable rotatable cleaning means in movable from said lower teat receiving position (LO) to said upper teat cleaning position (UP) by means of the reactive forces between said rotating cleaning means and said at least one teat in contact with said rotatable cleaning means.

3. A device according to claim 1 characterized in that said movable rotatable cleaning means is mounted on a swinging arm which is pivotably arranged about a pivot axis parallel with the longitudinal axis of said movable rotatable cleaning means and spaced therefrom, said swinging arm being movable from a lower position to an upper position.

4. A device according to claim 1 characterized in that pivot axis for said movable rotatable cleaning means is concentric with another said rotatable cleaning means.

5. A device according to claim 1 characterized in that it comprises only two rotatable cleaning means.

6. A device according to claim 1 characterized in that it comprises sensing means for detecting when said movable rotatable cleaning means is in said upper teat cleaning position (UP) and/or sensing means for detecting when said movable rotatable cleaning means is in said lower teat receiving position (LO) and/or sensing means for detecting when said supporting means is in contact with an udder to which said at least one teat is attached.

7. A device according to claim 1 characterized in that it comprises a guide means for guiding said teat into contact with said movable rotatable cleaning means.

8. A device according to claim 1 characterized in that said guide means is attached to said swinging arm.

9. A device according to claim 1 characterized in that it comprises force generating means for retaining said movable rotatable cleaning means in said lower position (LO) until said reactive forces reach a predetermined level.

10. A device according to claim 1 characterized in that it is mounted on maneuvering means in an automatic cleaning robot.

11. A device according to claim 1 characterized in that said movable rotatable cleaning means is adjustably mounted in said supporting means in order to permit adjustment of the distance between the lower teat receiving position (LO) and the upper teat cleaning position (UP).

12. A device according to claim 1 characterized in that said movable rotatable cleaning means is adjustably mounted in said supporting means in order to permit adjustment of the distance (L2, L2') between said movable rotatable cleaning means and another said rotatable cleaning means when said movable rotatable cleaning means is in said upper teat cleaning position (UP).

13. A device according to claim 1 characterized in that said movable rotatable cleaning means when moving from said upper teat cleaning position (UP) to said lower teat receiving position (LO) follows a path which is closer to another rotating teat cleaning means than the path that it follows when moving from said lower teat receiving position (LO) to said upper teat cleaning position (UP).

14. A method for cleaning the tip and sides of a teat in a device according to claim 1 characterized by the steps of:
    inserting said teat into an opening in said supporting means;
    raising said supporting means until said teat enters the region between said rotatable cleaning means when said movable cleaning means is in said lower teat receiving position (LO);
    allowing reactive forces between said teat and said movable cleaning means to displace said movable cleaning means to said upper teat cleaning position (UP).

15. Method according to claim 14 characterized by the step of:
    raising said supporting means until the said supporting means comes into contact with the udder supporting said teat.

16. Method according to claim 15 characterized by the steps of:
    lowering said supporting means a vertical distance which is less than the length of said teat;
    raising said supporting means said vertical distance.

17. Method according to claim 14 characterized by the step of lowering said supporting means a vertical distance which is greater than the length of said teat.

18. Method according to claim 17 characterized by the further step of raising said supporting means a vertical distance which is greater than the length of said teat.

19. A device according to claim 2 characterized in that:
    said movable rotatable cleaning means is mounted on a swinging arm which is pivotably arranged about a pivot axis parallel with the longitudinal axis of said movable rotatable cleaning means and spaced therefrom, said swinging arm being movable from a lower position to an upper position;
    the pivot axis for said movable rotatable cleaning means is concentric with another said rotatable cleaning means.

20. A device according to claim 19 characterized in that:
    it comprises only two rotatable cleaning means;
    it comprises one or more of sensing means for detecting when one said movable rotatable cleaning means is in said upper teat cleaning position (UP), sensing means for detecting when one said movable rotatable cleaning means is in said lower teat receiving position (LO), and sensing means for detecting when said supporting means is in contact with an udder to which said at least one teat is attached;
    it comprises a guide means attached to said swinging arm for guiding said teat into contact with one said movable rotatable cleaning means;
    it comprises force generating means for retaining one said movable rotatable cleaning means in said lower position (LO) until said reactive forces reach a predetermined level;
    it is mounted on maneuvering means in an automatic cleaning robot;
    one said movable rotatable cleaning means is adjustably mounted in said supporting means in order to permit adjustment of the distance between the lower teat receiving position (LO) and the upper teat cleaning position (UP);

one said movable rotatable cleaning means is adjustably mounted in said supporting means in order to permit adjustment of the distance (L2, L2') between said movable rotatable cleaning means and another said rotatable cleaning means when said movable rotatable cleaning means is in said upper teat cleaning position (UP);

one said movable rotatable cleaning means when moving from said upper teat cleaning position (UP) to said lower teat receiving position (LO) follows a path which is closer to another rotating teat cleaning means than the path that it follows when moving from said lower teat receiving position (LO) to said upper teat cleaning position (UP).

21. A method for cleaning the tip and sides of a teat in a device according to claim 19 characterized by the steps of:

inserting said teat into an opening in said supporting means;

raising said supporting means until said teat enters the region between said rotatable cleaning means when said movable cleaning means is in said lower teat receiving position (LO);

allowing reactive forces between said teat and said movable cleaning means to displace said movable cleaning means to said upper teat cleaning position (UP);

raising said supporting means until the said supporting means comes into contact with the udder supporting said teat;

lowering said supporting means a vertical distance which is less than the length of said teat;

raising said supporting means said vertical distance;

lowering said supporting means a vertical distance which is greater than the length of said teat; and raising said supporting means a vertical distance which is greater than the length of said teat.

* * * * *

UNITED STATES PATENT AND TRADEMARK OFFICE
CERTIFICATE OF CORRECTION

PATENT NO. : 6,321,688 B1
DATED : November 27, 2001
INVENTOR(S) : Jan Eriksson

It is certified that error appears in the above-identified patent and that said Letters Patent is hereby corrected as shown below:

Column 7,
Line 35, "of travel of" should read -- the travel of --.

Signed and Sealed this

Twenty-seventh Day of May, 2003

JAMES E. ROGAN
*Director of the United States Patent and Trademark Office*